United States Patent [19]

Fontaine et al.

[11] Patent Number: 5,228,121
[45] Date of Patent: Jul. 13, 1993

[54] DOCUMENT GENERATION USING INFORMATION ENGINEERING

[75] Inventors: Robert N. Fontaine, Concord; Barbara M. Staines, Temple; Alphonse J. Wojtas, East Hampstead, all of N.H.

[73] Assignee: Digital Equipment Corporation, Maynard, Mass.

[21] Appl. No.: 942,128

[22] Filed: Sep. 8, 1992

Related U.S. Application Data

[63] Continuation of Ser. No. 414,674, Sep. 29, 1989, abandoned.

[51] Int. Cl.$^5$ .............................................. G06F 15/62
[52] U.S. Cl. ...................................... 395/145; 395/148
[58] Field of Search ............................... 395/145–151, 395/117

[56] References Cited

U.S. PATENT DOCUMENTS

| | | | |
|---|---|---|---|
| 4,370,707 | 1/1983 | Phillips et al. | 364/200 |
| 4,445,795 | 5/1984 | Levine et al. | 400/63 |
| 4,454,576 | 6/1984 | McInroy et al. | 364/200 |
| 4,553,860 | 11/1985 | Imaizumi et al. | 400/68 |
| 4,555,759 | 11/1985 | McCaskill et al. | 364/300 |
| 4,558,413 | 12/1985 | Schmidt et al. | 364/200 X |
| 4,620,295 | 10/1986 | Aiken, Jr. | 364/900 |
| 4,674,040 | 6/1987 | Barker et al. | 364/300 |
| 4,723,209 | 2/1988 | Hernandez et al. | 364/300 |
| 4,815,029 | 3/1989 | Barker et al. | 364/900 |
| 4,939,689 | 7/1990 | Davis et al. | 364/900 |
| 4,972,349 | 11/1990 | Kleinberger | 364/900 |

OTHER PUBLICATIONS

Zager and Chase, *Using Microsoft WORD 2nd Edition*, Que Corp., 1987, pp. 11–13, 169–195 and 215–233.

*Primary Examiner*—Heather R. Herndon
*Attorney, Agent, or Firm*—Arnold, White & Durkee

[57] ABSTRACT

An information engineering writer's tool uses stored common, semi-common and unique information objects to build audience specific documentation, including specific instruction manuals. A recursive processing program retrieves and sorts called information objects a first time and then sorts the contents for nested calls to other information objects. Each information object is stored a single time. Recall of nested information objects is desirably limited to a single time for each printing or previewing of constructed documents.

16 Claims, 3 Drawing Sheets

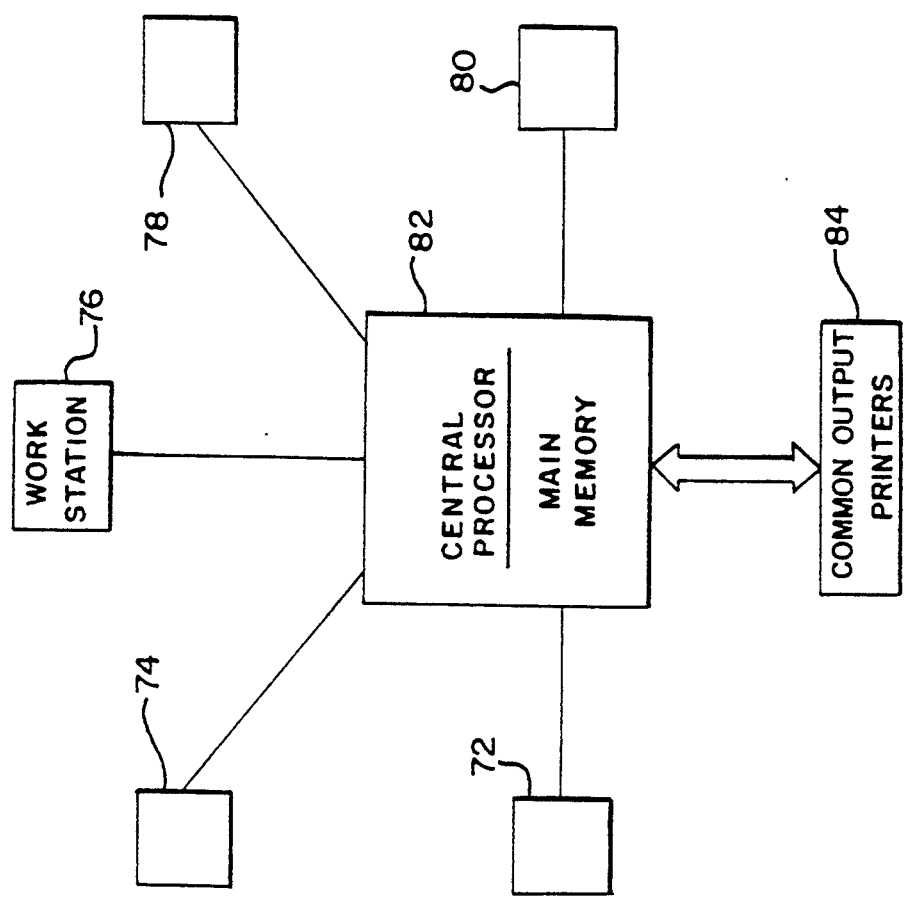
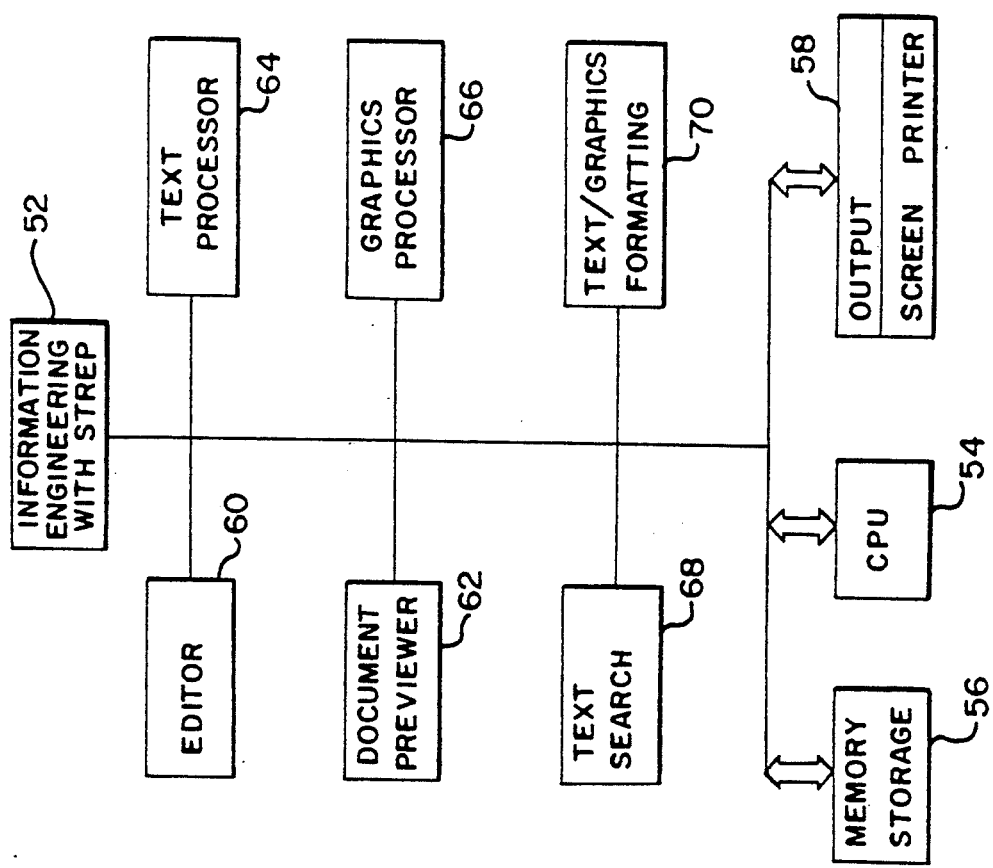

DOCUMENT GENERATION USING INFORMATION ENGINEERING

This is a continuation of copending application Ser. No. 07/414,674 filed on Sept. 29, 1989, now abandoned.

BACKGROUND OF THE INVENTION

The present invention relates generally to the field of data processing. More particularly, the present invention relates to document generation, for example, operation manuals from stored data. Even more particularly, the present invention pertains to specialized document generation from among common data files frequently shared with other documents or other versions of documents to produce audience specific documentation.

With the proliferation of complementary lines and products ranging from automobiles to household appliances to software, the ultimate user or installer is frequently faced with an information explosion. To assure complete disclosure, many installation or user manuals frequently include all of the information for all of the models in the product line. The user then must visually sort the information by caption, note, or heading to find that which pertains solely to the purchased model or version.

Of course, the other extreme—missing crucial information—is also a frequent problem. Many users and installers have encountered this headache when a manufacturer attempts to minimize documentation costs.

Likewise, the breakdown of traditional trade barriers has led to the marketing of the same product or line of products in many countries—many having a different national language. To assure complete disclosure, many instruction manuals frequently reprint each instruction in the language of each country where a sale is possible. The user then must visually sort the information by language to find that which pertains solely to the purchased model or version in the language in which the user finds the instructions familiar. This process is even more complicated when the instructions for every model in a multi-model line are reprinted in every language in every manual.

Other applications also suffer the potential for an overexposure to unnecessary information. Repair manuals, for example, may now be distributed electronically on disks or otherwise. The user desires only that information specific to the particular product being serviced. Nonetheless, the user wants all of the relevant information for that product. Likewise, the information provider may desire to restrict certain classes of information to certain classes of users. For example, classified information must be provided to some users but kept from others. Merely mixing classified information with unclassified information using the traditional conditional statement in the same manual or on the same disk is an unsatisfactory solution.

In the face of the need to provide complete information for all products, but not to overwhelm the user or provide inappropriate information, the information provider must typically employ a large staff of technical writers to generate user, installation or troubleshooting manuals specific to each model or version in each anticipated language and frequently broken out into classified and nonclassified information. However, with so many writers working on related projects, costs escalate and the information common to all models or versions can frequently be found to be inconsistent from model to model and from version to version. This, of course, can be very confusing and potentially misleading. However, it is not practical for any one writer to attempt to address the relation between topics in multiple products or versions; each writer faces a very specific task, regardless of how topics might be related.

SUMMARY OF THE INVENTION

The present invention generally seeks to overcome the deficiencies present in the art by introducing the concept of information engineering. The present invention provides an improved technique for organizing, storing, recalling and correlating information for document generation. A plurality of information objects containing data or text common to one or more documents are defined, generated and stored. A master file for each document with references to specific information objects is correspondingly defined, generated and stored. In association with the recall of a document master file, a recursive processor compiles a complete document for output composed of the contents of the information objects referenced in the document master file. The information objects may also contain references to other information objects. Information objects may also be organized into source files. The recursive processor operates to generate a single, complete document regardless of how many levels of reference are involved. Complete definition of terms is not required; relative definitions are acceptable and are filled in by the recursive processor throughout the processing step.

In a preferred embodiment, the writer selects a combination of source files and master files to produce the desired document. These are used as input to the recursive processor program. Additional text processing may be employed to put the completed document in the appropriate page format.

The present invention allows common information to be shared between related documents, while only being stored a single time. The documents themselves are audience specific. Writer productivity increases manyfold in use with other writing tools such as editors, text formatters, text processors, graphic processors and document previewers.

DESCRIPTION OF THE INVENTION

Those features of the present invention that are deemed to be novel are set forth with particularity in the appended claims. The foregoing objects, features and advantages may be more fully understood by reference to the following detailed description and the accompanying drawings of which:

FIG. 3 is a block diagram representation of one preferred operating environment of the present invention; and FIG. 4 is a further example of an operating environment that is readily conducive to implementation of a system in accordance with the present invention.

DETAILED DESCRIPTION OF A PREFERRED EMBODIMENT

Generally, the present invention in at least one preferred embodiment provides for storing, organizing and correlating common, semi-common and unique information for use in the generation of audience specific documentation. A recursive processor program accesses specific source files containing information objects in accordance with references thereto in a specific document master file or in another of the source files. The recursive processor compiles the resultant document a single time for further processing in accordance with a desired output format. The final results of the system operation is an audience specific document in accordance with a document master file and text and graphics data drawn from common source files. Preferably, the source files bear topical descriptions or names for ready access by one or more document authors.

Figure 1:
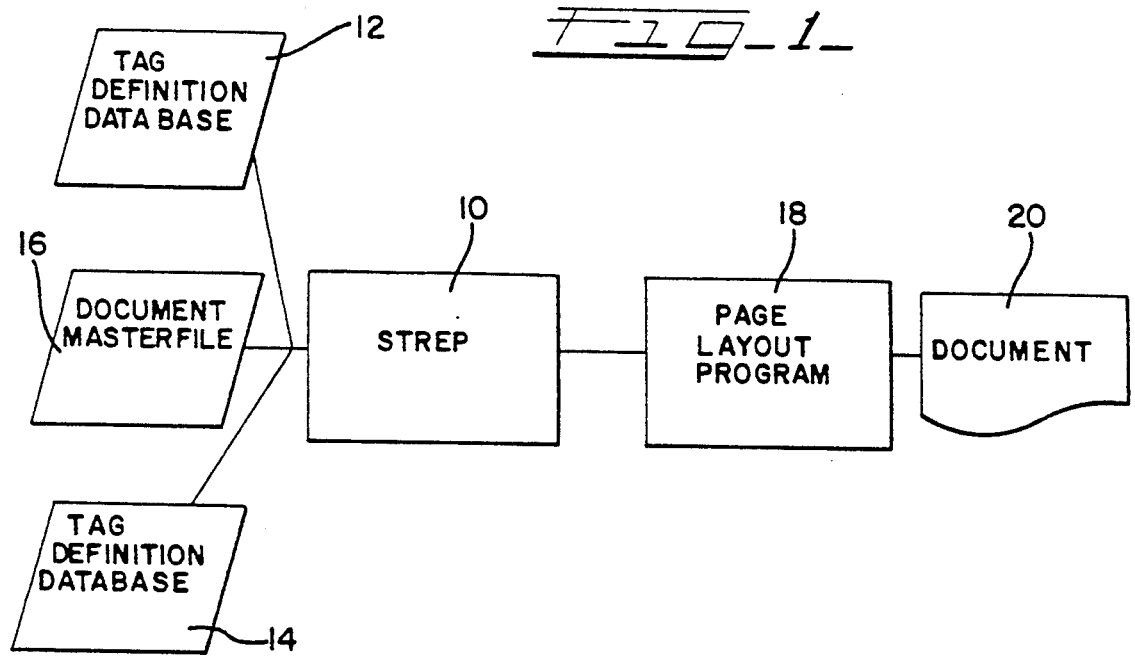
FIG. 1 is a block diagram representation of the system data flow according to the present invention.

Referring now to FIG. 1 therein is shown a preferred embodiment of the above described data flow in accordance with the present invention. Generally, the recursive processor program 10 accesses a plurality of information objects contained in tag definition databases 12 and 14 in accordance with the source file calls, document ordering and organization information contained in a document master file 16. The recursive processor program 10 provides a single, compiled document for formatting in accordance with any desired page layout program 18. The resultant, final document comprises a system output as shown at block 20. The system data flow is thus controlled by the recursive processor program 10.

Figure 2A:
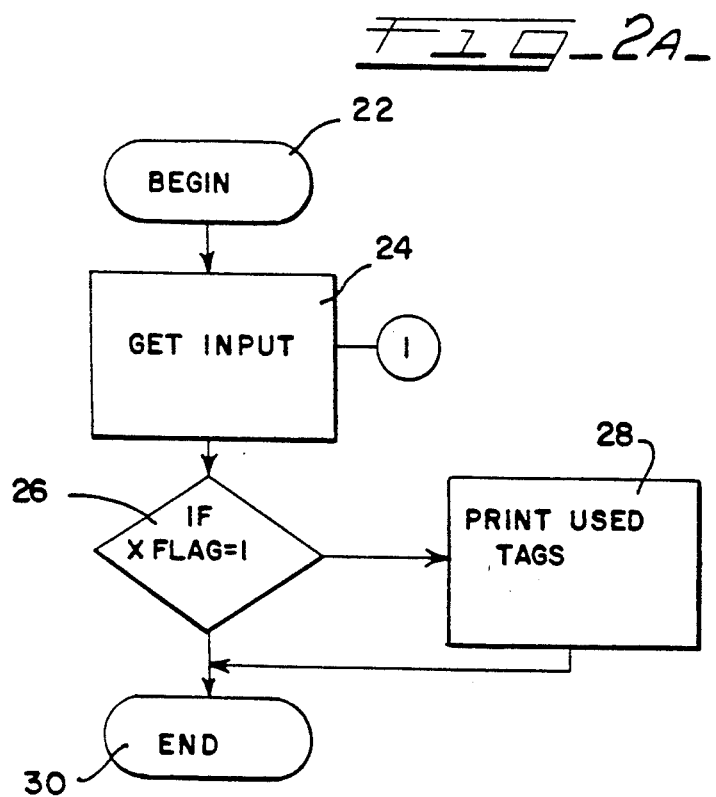
FIG. 2a is a first portion of a flow chart representation of a recursive processor for implementation in accordance with a preferred embodiment of the present invention.

Referring now to FIG. 2a, therein is shown a first portion of a flow chart representation of a preferred embodiment of the recursive processor program 10 referenced in FIG. 1 above. Generally, the process begins at block 22. In association with this step, the process accesses a selected one of typically a plurality of document master files. The document master file then provides an organizational plan and layout for the document to be generated. Subsequently, the recursive processer program illustrated in FIG. 2a retrieves the appropriate input for the document to be generated as shown on a block 24. In association with retrieving the input, the processor program branches to a subroutine shown generally as "1" in FIG. 2a. This subprogram is discussed in further detail below in association with FIG. 2b. After all of the input has been retrieved and all information object references have been resolved, if the user needs to see the resolution of all the information objects used in this document, the system performs a simple test as shown at a block 26. If so, system advances to a step shown at a block 28 in which the used tags are printed in some file specified by the writer. In this diagram, the term tags is used to generally represent the information objects. After these information object calls have been resolved in the appropriate sequence, the program ends as shown generally at a block 30.

Figure 2B:
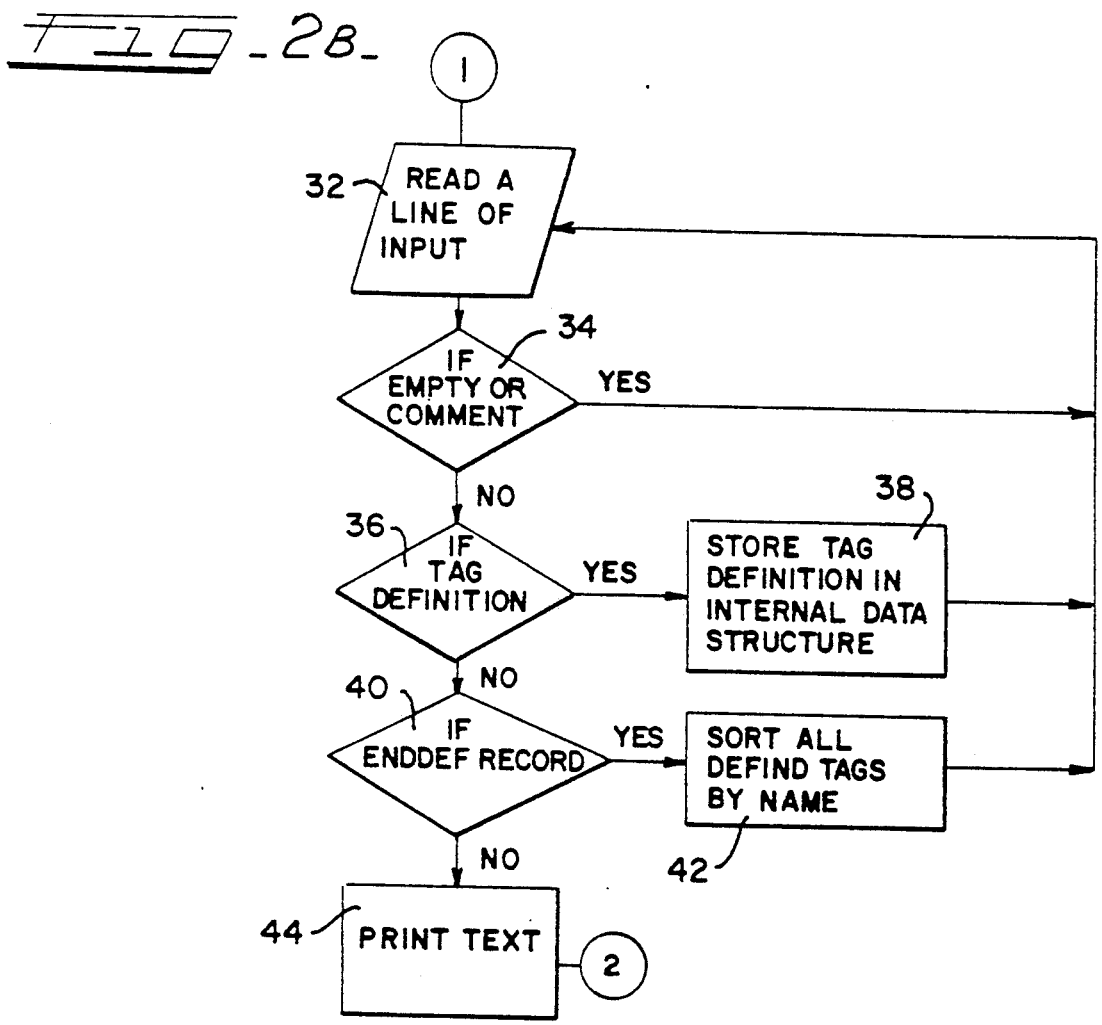
FIG. 2b is a second portion of a flow chart representation of a recursive processor for use in conjunction with an implementation of a preferred embodiment of the present invention.

Referring now to FIG. 2b, therein is shown the subprogram called at "1" as described above in conjunction with the description of FIG. 2a. Generally, the subprogram as shown at a block 32 retrieves or reads a line of input. If the result of the decision of the block 34 is that that line of input is empty or a comment, the system returns to the block 32 and reads the subsequent line of input. Once a tag definition is encountered as determined at a decision block 36, the recursive processor program stores the tag definition in the internal data structure for the operating document master file as shown at a block 38. The system then moves back to read a subsequent line of input at the block 32. This process is repeated over and over throughout the document master file until all tag definitions are stored in the internal data structure. At that time, the test shown at the "if enddef" decision block 40 will be yes. As such, the recursive processor then sorts all the defined tags alphabetically as shown at a block 42. After performing the alphabetic sort, the recursive processor returns to block 32 and reads another line of input. Once the steps shown in block 42 have been completed, it is envisioned that the system will advance to the print text block 44. In conjunction with printing the text at block 44, a separate subprogram generally referenced as "2" in FIG. 2b is called.

Figure 2C:
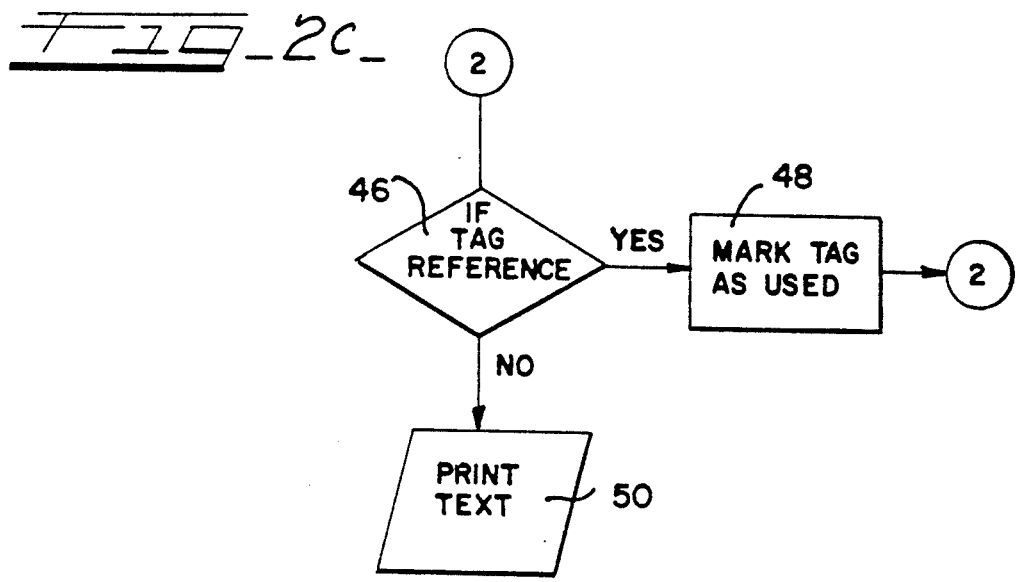
FIG. 2c is a further portion of a flow chart representation of a recursive processor in accordance with a preferred embodiment of the present invention.

Referring now to FIG. 2c therein is shown the basic print text subprogram referred to as "2" in FIG. 2b above. This subprogram at a block 46 determines whether the input line is text or a tag reference. If it is text, it is printed at a block 50. If it is a tag reference, the recursive processor preferably implements a binary search to substitute text, data or graphics for any nested tag calls. The print text routine calls itself until all nested tag references are resolved. Additionally, the program marks that tag as used as shown at a block 48.

Those skilled in the art will appreciate, in reference to the foregoing flow chart representations of the recursive processor "strep" program, that three advantages of functionality are implemented in conjunction with this recursive processor and associated labeling rules. Meaningful names are allowed for each of the graphics or text units—referred to as "tags" or information objects in the preferred embodiment. Further, the author of the document is allowed to define and call information objects or tags in any order. Finally, the information objects or tags may be organized into meaningful source files for ready recall and logical organization. In the preferred embodiment, use of fifty characters to provide unique, meaningful names are allowed. Any ASCII text may be used therefor.

In the preferred embodiment, the information object definition for processing with the "strep" recursive processor program is accomplished through a simple procedure. The tag definition is initiated with an instruction ".tag tagname".

Following the tagname, the contents of the information object or tag is stored. Once the tag definition is complete, the instruction ".endtag" is entered. The tag contents may then be retrieved through any desired compiler or retrieval implementation. For example, in the preferred embodiment the information object (tag) is recalled through the instruction "%%tagname%%". This may be placed as a separate line in the document master file or may be implemented in the body of text within the document master file or even may be placed within another information object.

The operation of the compiler in the preferred embodiment specifically allows tags to be referenced within other tags. In the preferred embodiment, any level of tag reference hierarchy may be implemented in this fashion.

The recursive tag handling feature of the strep program in the preferred embodiment also allows the author to define information objects in any order. This allows the author to function in a normal logical fashion without regard to whether tag names have previously been defined. They may be called in one tag and subsequently defined for convenience. Likewise, meaningful source files may be generated in which separate tags which are never used in the same document may still be stored in the same source file. For example, power up instructions for all products may be stored in a power up source file and the call to the appropriate power up instructions may be implemented simply by the original identification of the particular product or model number for which the document is generated.

The organization of tags or information objects into source files facilitates the operation of the strep recursive processor program of the preferred embodiment in association with a variety of other writer tools such as editors, formatters, graphics processors and text processors. That is, format information objects may be stored in a single source file. For example, format information objects for macro package A can be stored in one source file; format information objects for macro package B can be stored in another source file; and so on. The document master file calls these format information objects. The recursive processor program resolves these format information objects for whichever macro package (A or B) is specified by the document master file. The final document can then be formatted by the appropriate text formatter.

Likewise, templates may be implemented to control the order in which the information objects are called. This allows for reorganization of the information objects without altering master files when a change must be made to the order or to the content of particular documents. The template itself may be readily manipulated by the author just like any other information object. The use of templates to control order allows the writer to change the entire organization of a book or a chapter in one place. Simply changing the order of calls in a template changes the location of the information objects governed by the template in any document in which it is used.

In this fashion, the strep recursive program provides maximum flexibility while at the same time realizing the information engineering goal that each information object or tag be defined in only one place. The assignment of meaningful names to information objects and the ability to define information objects after they are used give the writer great flexibility in subsequently manipulating those information objects. The ability to recall other information objects within information objects and to string them together in association with the use of templates adds even more flexibility. A retagging feature in which a particular information object may be retagged for specific master files in order to provide a NULL function or more specific text further adds flexibility for the author.

The step described in association with block 40 of FIG. 2b represents a culmination of an improved search algorithm. In association with the steps shown at blocks 36, 38 and 42, the strep recursive processor program replaces each tag definition with the text it represents when it is initially encountered; however, the program does not perform text substitution for tags that are called within a tag definition until it is ready to produce output. In this fashion, each tag definition is stored in memory only once, thereby minimizing the amount of memory space necessary for accommodating any particular document. All common information is not recalled in a mass memory operation. This also speeds up the program in operation by limiting the resubstitutions. The "enddef" statement implemented at the block 40 in FIG. 2b signals to the strep recursive processor that the tag definitions are complete. The program then sorts the tag names alphabetically and in the preferred embodiment uses a binary search to substitute text for nested tags. The net result of this organization and operation of the strep recursive processor is to allow the processing of master files using more than 3500 tag definitions with as many as six levels of nested tag calls in approximately eight seconds of user time on a moderately loaded VAX-11/780.

In a preferred embodiment of a program listing for implementing the recursive handling features of the present invention, the various definitions are first laid out. For example, the maximum size of a tag name is limited to fifty characters, while the maximum number of tags is set to 100,000, and the maximum length of an input line is set to 5000 characters. Separate states for identifying a TAG, RETAG, ENDTAG and ENDDEF are also defined. At this point, if the writer chooses the appropriate option, a file is created for all used tags and their definitions. The number of recession levels is set to zero, so that incrementation during processing will track the number of levels of recursion. An index is also created to allow comparison of any encountered tagname with the tagname of the tag currently being processed. This allows a test that prevents tags from calling themselves and creating an infinite loop.

The recursive processing program then proceeds as set forth in the flow charts of FIGS. 2A-C. For speed in processing a simple linear search is performed if less than ten tags are defined in a document. Drawing from the definitions set forth at the beginning of the program, the strep processor preferably performs a syntax check to ensure that each tag begins with ".tag" or ".retag" and ends with a ".endtag" or other acceptable delimiters before processing any specific information object. Also in the preferred embodiment, the program performs the infinite loop test described above.

In operation, a strep intermediate file contains all used tags and their definitions, if the writer chose the appropriate option. This forms the base for text string searches and provides a link between the text string and the tagname that defines that string.

Referring to FIG. 3, therein is shown the relationship of the information engineering system with the strep recursive processor program 52 in association with the other elements of a typical computerized writer's work station. As shown, a CPU 54 controls operation of the system for access to a memory storage facility 56 and output to suitable output device 58 such as a VDT screen or printer. In association with the recursive processor program of the preferred embodiment of the present invention, an editor 60, a document previewer 62, a text processor 64, a graphics processor 66, a text search module 68, and a normal text and graphics formatting module 70 may be utilized. Any known or commercial products are deemed to be sufficient for each of these modules. Other associated software modules may be readily added depending on the particular application and the needs of the individual writer.

In the preferred embodiment, the text editor, such as "vi", "elle", "emacs", is used to create information objects or tags. The strep recursive processor program performs the translation of these information objects into documents. The information objects are organized through the use of the master files discussed above. The tag search function is performed using any suitable utility such as the "grep" utility or strep itself. Text previewing is desirable at the writer's work station and is performed in the preferred embodiment using a "wysiwig" previewer or any other known product. In the preferred embodiment, format information is provided through the use of objects that translate to the "mu" macro package. Any other text or graphics formatting package that is acceptable to a particular application or writer may likewise be implemented. Also, in the preferred embodiment the text processor utilized is the "ditroff" processor package. Graphics is handled using the "pic" utility, and source control is provided through the "sccs" utility for locking and unlocking files, although other implementations of the preferred embodiment have used the "rcs" utility. It is envisioned that a commercial implementation or writer's work station built around the recursive processor program of the present invention would also support such writer tools as spell checkers, table of contents utilities and indexers as well as any other utility desirable to a particular writer.

Referring now to FIG. 4, therein is shown an envisioned environment for application of the present invention. A plurality of work stations 72, 74, 76, 78 and 80 communicate with a central processor 82 to drive output through common output devices such as printer 84. This environment allows a plurality of writers working at different work stations to create and maintain common, semi-common and unique information objects and correspondingly support a variety of related documents. In this and all applications of the present invention, the information objects are ideally stored a single time and accessed as needed by either the original author or any other writers working on related projects. It is envisioned that the system illustrated generally in FIG. 4 may be implemented through the use of a DECsystem 5400 processor with several gigabytes of disk storage space. The work stations illustration in FIG. 4 may be implemented through the use of devices such as the DECstation 3100 workstations with disk drive support such an RZ55 disk drive. The printers or any other output devices may be such as are desired in individual applications.

The foregoing description sets forth a technique for storing, organizing and correlating common, semi-common and unique information for use in the generation of audience-specific documentation. A recursive processor program accesses specific source files containing information objects as referenced in a specific document master file or in another of the source files. A recursive processor compiles the resultant document a single time for further processing in a desired format. The final result is an audience-specific document derived from a document master file that contains text, graphics and calls to information objects, drawn from stored, common, topically identified source files.

The source files and the master file may contain references to information objects or tags. The information objects or tags form the basis of the information engineering concept of storing information units only one time, but using them as often as necessary in any one document or in any plurality of documents. The recursive processor accesses any information objects including those that may be hierarchically nested in other information objects.

The contents of an information object can be in any language. In fact, an information object name can be used with different language source files. For example, one information object name can map to an English language source file, a French language source file, and so forth. It is envisioned that a translator can be used to remap English Rules to French, and the strep processor may implement such a translation through a call to a translator program and operation as otherwise described above.

The combination of the strep recursive processor program and the singly-stored information objects of the present invention also allows document portability. That is, the present invention readily facilitates providing essentially the same document or set of documents to a user or set of users for processing in a variety of applications without revising the core document. The document, thus, becomes portable.

For example, document portability comes into play when a user desires a document on an electrical or magnetic medium for processing, but the user has a different document formatting package than the document originator. Using the strep recursive processor, the document originator can rerun the document with a call to the formatting package being run by the user. The document, thus, becomes compatible with the user's system. This becomes particularly advantageous when a large organization, such as the government, desires to distribute a document to a number of users electronically but is faced with a host of different document formatting packages among the intended users.

The present invention has been described above in terms of a number of preferred embodiments. The invention itself is set forth with particularity in the appended claims. Such modifications and alterations as would be apparent to one skilled in the art and familiar with the teachings of this application should be deemed to fall within the spirit and scope of the following claims. Furthermore, interconnections and modifications for particular applications of the preferred embodiment to other specific applications are likewise deemed to be within the skill of those in the art.

What I claim is:

1. A method for compiling a document from one or more document master files and from a plurality of source files, each one of said plurality of source files containing at least one definition for an information object and at least some of said plurality of source files containing a different definition for the same information object comprising the steps of:
    selecting at least one document master file containing at least one definition for an information object, text, a plurality of calls to information objects and at least one redefinition for an information object;
    selecting a plurality of source files, each containing at least one definition for an information object referenced as one of said calls to an information object in said master file whereby a portion of the content of the document is determined by the selection of said source files;
    storing in memory only once said definitions for information objects from said selected source files and from said selected document master file, regardless of the number of calls to the same information object, at least one of said definitions for an information object containing another call to an information object;

sorting said stored definitions for information objects into a predetermined order;

reading from memory each of said definitions for an information object referenced as a call to an information object in said selected document master file in order in which said calls to information objects are referenced in said selected document master file;

reading from memory each additional definition for an information object referenced as a call to an information object within said read definitions for information objects;

retrieving said text from said selected document master file;

retrieving said redefinition for an information object from said selected document master file and substituting said redefinition for said stored definition for said information object;

outputting a document corresponding to read definitions for information objects, including said redefinition for information objects and said retrieved text from said selected document master file.

2. A method for compiling a document as set forth in claim 1 wherein one of said selected plurality of source files contains text formatting macros as said definitions for information objects as referenced by said calls to information objects in said selected document master file and said method further comprises the step of:

formatting, according to said text formatting macros, said retrieved text from said document master file and said read definitions for information objects including said redefinition for information objects before the step of outputting.

3. The method for compiling a document as set forth in claim 1 wherein said redefinition for an information object comprises call to an information object.

4. The method for compiling a document as set forth in claim 1 wherein said redefinition for an information object comprises text.

5. The method for compiling a document as set forth in claim 1 wherein said redefinition for an information object comprises text and a call to an information object.

6. The method for compiling a document as set forth in claim 1 wherein said redefinition for an information object comprises a null object.

7. The method of compiling a document as set forth in claim 1 wherein at least one of said definitions for an information object is a template object containing calls to other information objects arranged in a predetermined order.

8. A method for compiling a document from at least one master file and from a plurality of source files, each one of said plurality of source files containing at least one definition for an information object and at least some of said plurality of source files containing a different definition for the same information object comprising the steps of:

selecting at least one document master file containing a plurality of calls to information objects and at least one redefinition for an information object;

selecting a plurality of source files, each containing at least one definition for an information object referenced as one of said calls to an information object in said master file whereby a portion of the content of the document is determined by the selection of said source files;

storing in memory only once said definitions for information objects from said selected source files and from said selected document master file regardless of the number of calls to the same information object, at least one of said definitions for an information object containing another call to an information object;

sorting said stored definitions for information objects into a predetermined order;

reading from memory each of said definitions for an information object referenced as a call to an information object in said selected document master file in the order in which said calls to information objects are referenced in said selected document master file;

reading from memory each additional definition for an information object referenced as a call to an information object within said read definitions for information objects;

retrieving said text from said selected document master file;

retrieving said redefinition for an information object from said selected document master file and substituting said redefinition for said stored definition for said information object;

outputting a document corresponding to said read definitions for information objects, including said redefinition for information objects and said retrieved text from said selected document master file.

9. A method for compiling a document as set forth in claim 8 wherein one of said selected plurality of source files contains text formatting macros as said definitions for information objects as referenced by said calls to information objects in said selected document master file and said method further comprises the step of:

formatting, according to said text formatting macros, said read definitions for information objects including said redefinition for information objects before the step of outputting.

10. The method for compiling a document as set forth in claim 8 wherein said redefinition for an information object comprises a call to an information object.

11. The method for compiling a document as set forth in claim 8 wherein said redefinition for an information object comprises text.

12. The method for compiling a document as set forth in claim 8 wherein said redefinition for an information object comprises text and a call to an information object.

13. The method for compiling a document as set forth in claim 8 wherein said redefinition for an information object comprises a null object.

14. The method of compiling a document as set forth in claim 8 wherein at least one of said definitions for an information object is a template object containing calls to other information objects arranged in a predetermined order.

15. A system for compiling a document for outputting comprising:

one or more document master files, each of said document master files containing at least one definition for an information object, text, a plurality of calls to information objects and at least one redefinition for an information object;

a plurality of source files containing at least one definition for an information object and at least some of said plurality of source files containing a different definition for the same information object;

means for selecting at least one of said document master files and at least two of said plurality of source files, each of said selected source files containing a definition for an information object referenced as one of said calls to an information object in said selected document master file whereby a portion of the content of the document is determined by the selection of said source files;

memory means for storing said definitions for information objects from said selected source files and from said document master file, at least one of said definitions for information objects containing another cell to an information objects;

means for sorting said stored definitions for information objects into a predetermined order;

data processing means for reading from said memory means said definitions for information objects referenced as calls to information objects in said selected document master file in the order in which said calls to information objects are referenced in said selected document master file and for reading from said memory means each additional definition for an information object referenced as a call to an information object within said read definitions for information objects and for retrieving said text from said selected document master file and for retrieving said redefinitions for an information object from said selected document master file and substituting said redefinition for said stored definition for said information object; and means for outputting a document corresponding to said read definitions for information objects including said redefinition for information objects and said retrieved text from said selected document master file.

16. A system for compiling a document for outputting as set forth in claim 15 wherein at least one of said selected plurality of source files contains text formatting macros as said definitions for information objects referenced as said calls to information objects in said selected master file and further comprising means for formatting, according to said text formatting macros, said read definitions for information objects including said redefinition for information objects and said retrieved text from said selected document master file before printing.

* * * * *